US010150390B2

(12) United States Patent
Sedlack

(10) Patent No.: US 10,150,390 B2
(45) Date of Patent: *Dec. 11, 2018

(54) CHILD CAR SEAT AND BASE

(71) Applicant: Baby Trend, Inc., Ontario, CA (US)

(72) Inventor: Mark Sedlack, Clinton, OH (US)

(73) Assignee: Baby Trend, Inc., Ontario, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/255,763

(22) Filed: Sep. 2, 2016

(65) Prior Publication Data

US 2016/0368401 A1 Dec. 22, 2016

Related U.S. Application Data

(63) Continuation of application No. 14/238,313, filed as application No. PCT/US2012/051605 on Aug. 20, 2012, now Pat. No. 9,452,695.

(60) Provisional application No. 61/525,663, filed on Aug. 19, 2011.

(51) Int. Cl.
*B60N 2/28* (2006.01)
*B60N 2/427* (2006.01)

(52) U.S. Cl.
CPC ......... *B60N 2/2884* (2013.01); *B60N 2/2821* (2013.01); *B60N 2/2863* (2013.01); *B60N 2/2875* (2013.01); *B60N 2/2887* (2013.01); *B60N 2/42709* (2013.01)

(58) Field of Classification Search
CPC .. B60N 2/2821; B60N 2/2884; B60N 2/2863; B60N 2/2875; B60N 2/2887; B60N 2/42709
See application file for complete search history.

(56) References Cited

U.S. PATENT DOCUMENTS

| | | | | | |
|---|---|---|---|---|---|
| 5,110,182 | A * | 5/1992 | Beauvais | ............. | B60N 2/2821 297/216.11 |
| 5,685,603 | A * | 11/1997 | Lane, Jr. | ............. | B60N 2/2821 297/216.11 |
| 6,109,689 | A * | 8/2000 | Nanni | ............. | B60N 2/2821 248/638 |
| 6,513,870 | B1 * | 2/2003 | Takizawa | ............. | B60N 2/2812 297/216.11 |
| 7,219,958 | B2 * | 5/2007 | Yamazaki | ............. | B60N 2/2806 297/216.11 |
| 7,488,034 | B2 * | 2/2009 | Ohren | ............. | B60N 2/2821 297/183.6 |

(Continued)

FOREIGN PATENT DOCUMENTS

| | | |
|---|---|---|
| CN | 1972819 A | 5/2007 |
| CN | 201077391 Y | 6/2008 |

(Continued)

OTHER PUBLICATIONS

European Search Report issued by the European Patent Office, dated Oct. 14, 2015, for Application No. EP 12825964.5; 14 pages.

(Continued)

*Primary Examiner* — Philip F Gabler
(74) *Attorney, Agent, or Firm* — Faegre Baker Daniels LLP

(57) ABSTRACT

A car seat and base are provided for controlling movement of the car seat during deceleration of a vehicle in which the car seat and base are secured.

13 Claims, 10 Drawing Sheets

(56) References Cited

U.S. PATENT DOCUMENTS

| | | | |
|---|---|---|---|
| 9,452,695 B2* | 9/2016 | Sedlack | B60N 2/2821 |
| 2006/0170262 A1* | 8/2006 | Gold | B60N 2/2869 |
| | | | 297/256.12 |
| 2008/0224516 A1* | 9/2008 | Vegt | B60N 2/2824 |
| | | | 297/256.16 |
| 2008/0315647 A1 | 12/2008 | Carine | |
| 2009/0102253 A1* | 4/2009 | Forbes | B60N 2/2821 |
| | | | 297/216.11 |

FOREIGN PATENT DOCUMENTS

| | | |
|---|---|---|
| DE | 10260812 A1 | 7/2004 |
| EP | 1953035 A2 | 8/2008 |

OTHER PUBLICATIONS

Letter Exam Report (translated to English language), issued by the State Intellectual Property Office of the People's Republic of China, dated Nov. 26, 2015, for Application No. 201280040392.3; 9 pages.

* cited by examiner

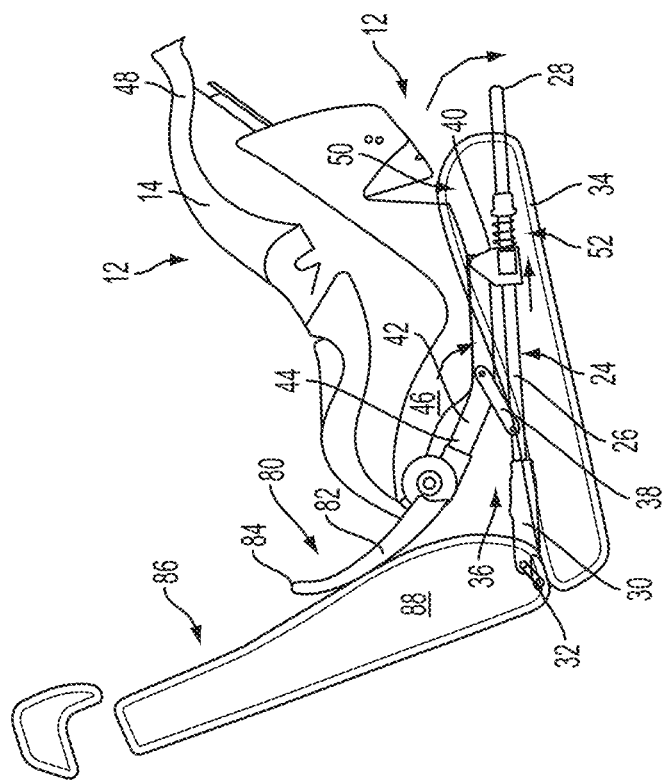
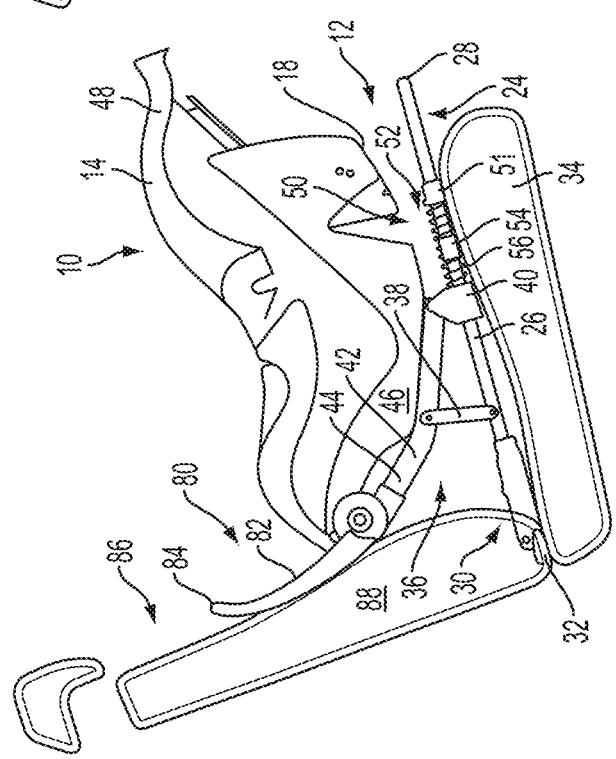

CHILD CAR SEAT AND BASE

PRIORITY

This application claims priority and is a continuation of U.S. Utility patent application Ser. No. 14/238,313, having a 371(c) date of Aug. 18, 2014 which is a National Phase entry of PCT Application No. PCT/US2012/051605 filed Aug. 20, 2012, which claims priority to U.S. Provisional Patent Application Ser. No. 61/525,663, filed Aug. 19, 2011, titled "Child Car Seat and Base" to Mark A. Sedlack, the entire disclosures of each of the aforementioned applications are expressly incorporated by reference herein.

FIELD

The present disclosure relates to generally to a child car seat, and more particularly to a child car seat attached to a base mountable in a vehicle.

BACKGROUND AND SUMMARY OF THE INVENTION

According to the present invention a combination car seat and car seat base is provided that is configured to adsorb inertial energy in the event of deceleration of a car or other change in velocity of the car.

According on aspect of the present disclosure, a car seat and car seat base combination are provided that compensate for movement of the combination during deceleration such that a child position in the car seat is more erect in the car seat than they otherwise would be. As such, potential reclining of the car seat during deceleration is reduced, eliminated, or otherwise countered.

According to one aspect of the present disclosure, a combination is provided including a car seat configured to receive a child, and a car seat base configured to secure the car seat to a car. The car seat base includes a car base member configured to be pivotably coupled to a car, a pivot member pivotably coupled to base member, and a seat base member pivotably coupled to pivot member and slidably coupled to car seat base member According to one aspect of the present disclosure, one or more compliant members are provided that adsorb the inertial energy. One compliant member may permanently adsorb the energy. Another compliant member may temporarily adsorb the energy.

According to one aspect of the present invention, a combination is provided including a car seat configured to receive a child, and a car seat base configured to secure the car seat to a car. The car seat base includes a first compliant member and a second compliant member. Inertial energy of the car seat is absorbed by the first compliant member during movement of the car seat in a forward direction relative to the car when secured to a car and a majority of the inertial energy adsorbed by the first compliant member is not returned to the car seat. Inertial energy of the car seat is absorbed by the second compliant member during movement of the car seat in the forward direction and a majority of the inertial energy absorbed by the second compliant member is returned to the car seat.

According to another aspect of the present inventions, a combination is provided including a car seat configured to receive a child, and a car seat base configured to secure the car seat to a car. The car seat base includes a compliant member, and an expansion member positioned to expand the compliant member. The compliant member adsorbs inertial energy of the car seat during expansion by the expansion member during movement of the car seat in a forward direction relative to the car when secured to a car.

According to another aspect of the present invention, a combination is provided including a car seat configured to receive a child and a car seat base configured to secure the car seat to a car. The car seat base includes a car base member configured to be coupled to a car, a seat base member coupled to car seat base member, and an inertia dampening assembly configured to dampen movement of car seat relative to the car. At least one of the car base member and the seat base member includes a window positioned to allow viewing of the inertia dampening assembly.

BRIEF DESCRIPTION OF THE DRAWINGS

The above-mentioned and other features of the disclosure, and the manner of attaining them, will become more apparent and the disclosure itself will be better understood by reference to the following description taken in conjunction with the accompanying drawings, wherein:

FIG. 1A is a side elevation view of a child car seat mounted on a base that is secured to a vehicle seat showing the child car seat in a initial, normal use position;

FIG. 1B is a view similar to FIG. 1 showing the base sunken into the vehicle seat in response to a vehicle collision impact and the position of the child seat relative to the base altered as a result of the collision vehicle impact;

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 4:
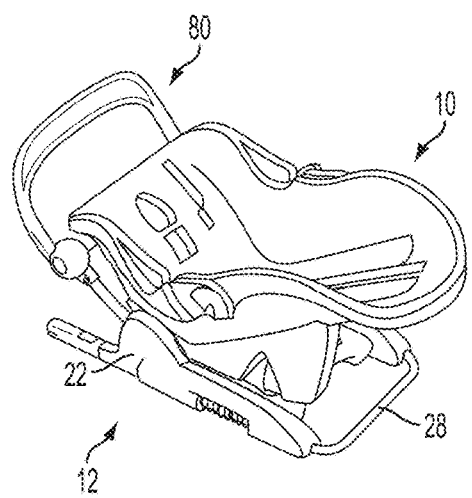
FIG. 4 is a perspective view of the child car seat and base including shells covering components of the base.
Figure 5:
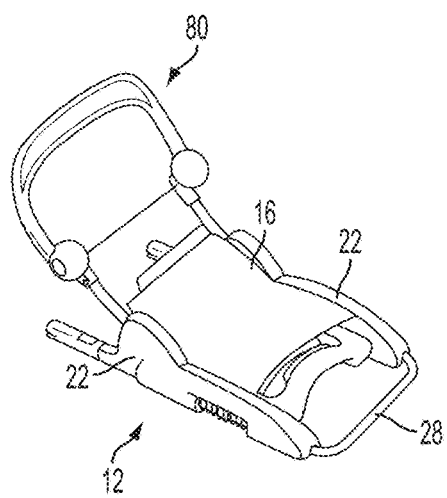
FIG. 5 is a view similar to FIG. 4 showing the child car seat removed from the base.

Referring to FIG. 1A, an exemplary child car seat 10 and base 12 are shown. Car seat 10 generally includes a car seat shell 14. As shown in FIGS. 4 and 5, car seat shell 14 is coupled to base 12 by a car seat attachment 16 that complements an underside 18 of car seat shell 14. Additional details of child car seat 10 and a suitable attachment between car seat shell 14 and base 12 are provided in U.S. Pat. No. 7,004,541 to Mark Sedlack, titled "Adjustable Infant Car Seat with Multiple-Range Angle Indicator", filed May 11, 2004, the entire disclosure of which is expressly incorporated by reference herein. For illustrative purposes, car seat attachment 16, an adjustment assembly 18 (see, for example, FIG. 7), and covers 22 (see, for example, FIG. 6) are not shown in FIGS. 1A and 1B and other figures. As used herein, the term "car" is intended to include cars, trucks, vans, SUV's and other vehicles suitable for transporting children.

According to the present disclosure, the position and orientation of child car seat 10 relative to base 12 can change during a vehicle impact during a collision. For example, child car seat 10 moves forward and down relative to base 12 from the position shown in FIG. 1A (pre-collision) to the position shown in FIG. 1B (collision maximum movement).

Base 12 includes a U-shaped tubular car base member 24 having a pair of legs 26 and a bend 28 connecting pair of legs 26. Ends of legs 26 each include a latch 30 that connect to the two lower anchors 32 of the universal LATCH system for vehicle car seats. Additional details of suitable latches 30 are provided in U.S. Pat. No. 7,004,541, incorporated by reference above. According to alternative embodiments of the present disclosure, tubular base member may be coupled to the vehicle using the vehicle's lap belt. Latches 30 may be replaced with a housing or other structure coupled to legs 26 that receives a portion of the lap belt, which is secured on one side to the vehicle and on the other side with the seat buckle. The housings may also be incorporated into latch 30 rather than replacing latches 30.

During a collision, forward momentum of car seat 12, any occupant therein, and base 12 cause U-shaped tubular base member to rotate clockwise (as viewed in FIGS. 1A and 1B) about anchors 32 causing tubular car base member 24 to compress vehicle cushion 34 as shown in FIG. 1B. As a result of this rotation, portions of car seat 12 and the occupant therein lower during the collision.

Figure 6:
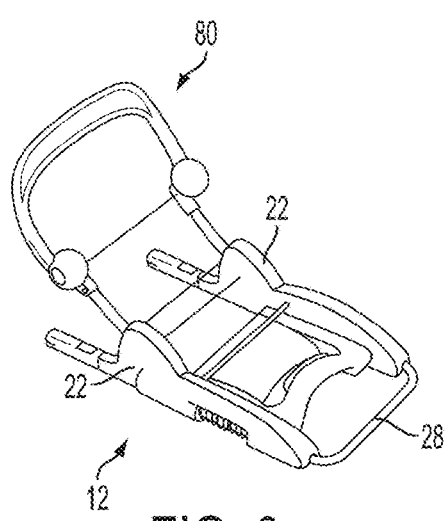
FIG. 6 is a view similar to FIG. 5 showing a car seat attachment removed from the base.

Base 12 further includes an attachment assembly 36 coupled to base 12 and car seat attachment 16 that changes the position and orientation of child car seat 10 relative to base 12 during a vehicle collision impact during a collision as mentioned above. Attachment assembly 36 includes first pivot members 38 pivotably coupled to U-shaped tubular car base member 24, slidable brackets 40 slidably coupled to U-shaped tubular car base member 24, and a car seat base member 42 pivotably coupled to first pivot members 38 and slidable brackets 40 that support car seat attachment 16 (shown in FIG. 5). During a collision, first pivot member 38 rotates clockwise, slidable bracket 40 slides to the right, and car seat base member 42 rotates counterclockwise and moves to the right with slidable bracket 40 as shown in FIGS. 1A and 1B. During this movement, back end 44 of car seat base member 42 lowers, pulling a back end 46 of car seat 10 down with it. As a result of this downward movement of back end 46 of car seat 10, back end 46 lowers relative to a front end 48 of car seat 10 causing car seat 10 to rotate in a counterclockwise direction relative to U-shaped tubular car base member 24. The counterclockwise rotation of car seat 10 relative to U-shaped tubular car base member 24 counters the clockwise rotation U-shaped tubular car base member 24 mentioned above. According to the preferred embodiment of the present disclosure, this counterclockwise rotation overcompensates for the clockwise movement so that the inclination of car seat 10 increases as a result of the collision. By increasing the angle of inclination, the occupant of the car seat is more upright to absorb the impact of the collision. First pivot members 38, portions of car seat base member 42, slidable brackets 40, and other components of base 12 are covered by covers 22 as shown in FIGS. 4-6.

Figure 2:
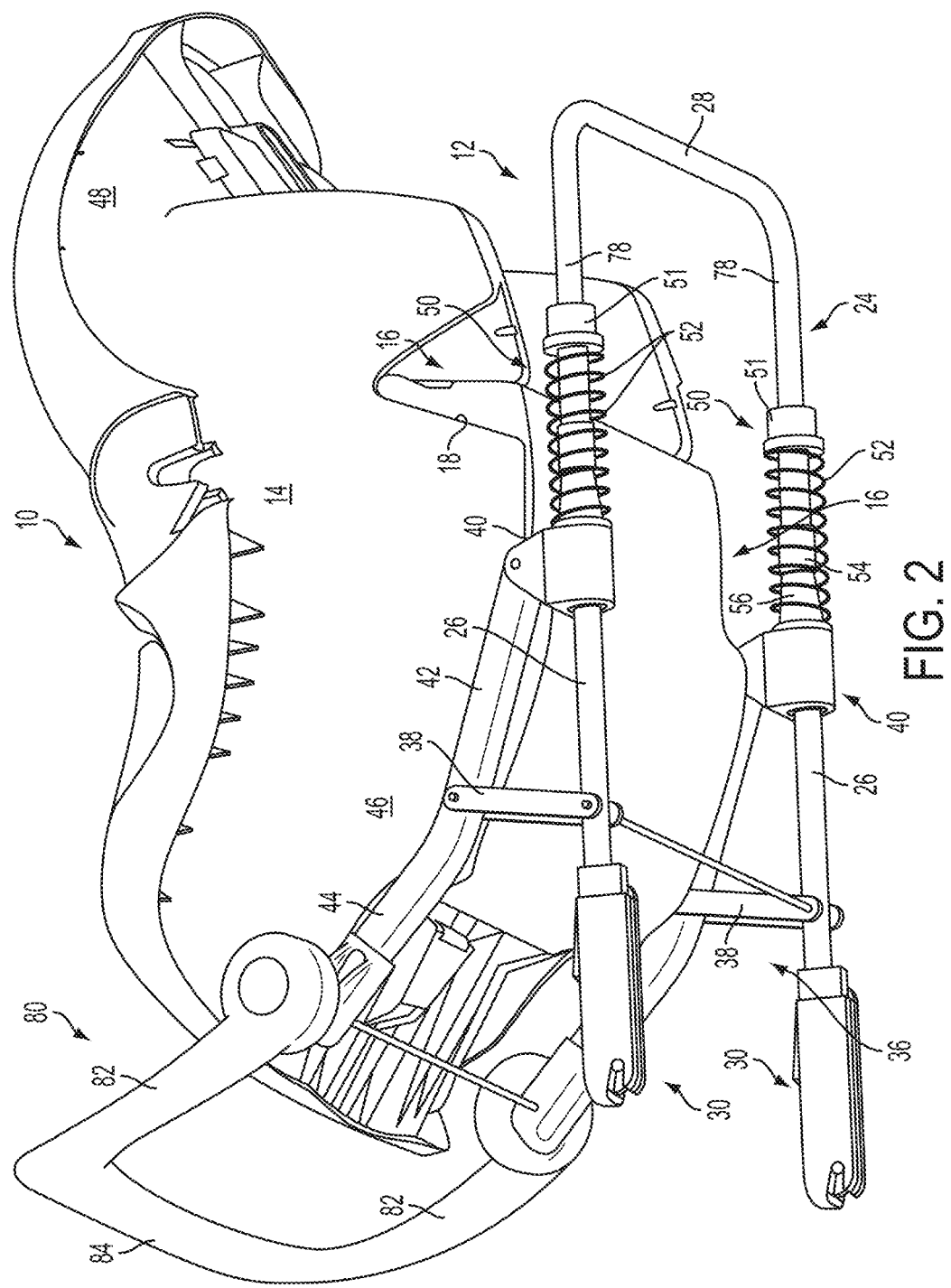
FIG. 2 is a perspective view of the child car seat and base of FIG. 1 showing portions of an underside thereof including an inertia dampening assembly including a spring and other components positioned to absorb inertia of the child car seat during vehicle impact.
Figure 3:
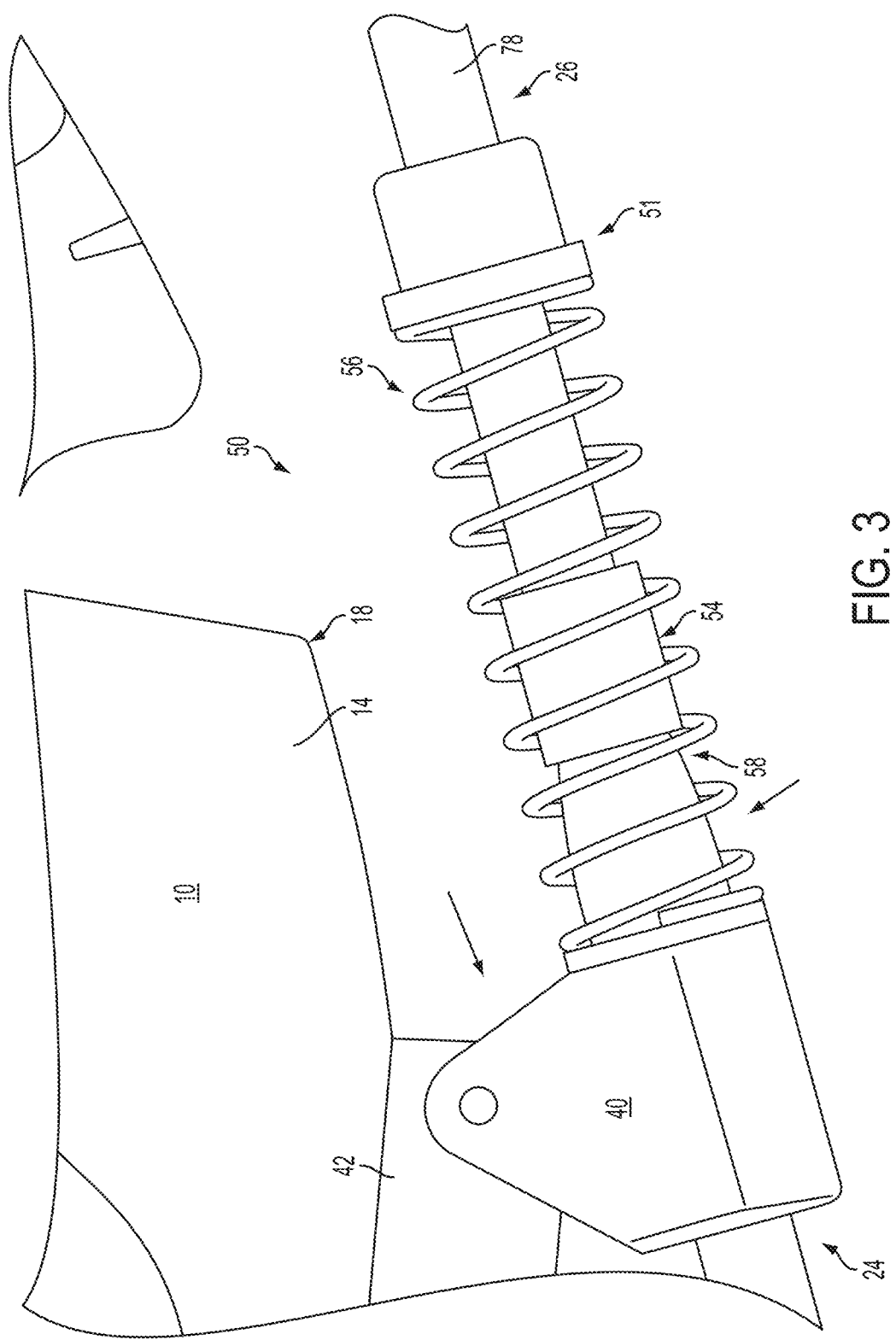
FIG. 3 is a side elevation view showing the spring and other components of the inertia dampening assembly of FIG. 2.

To further reduce the impact of a collision, base 12 further includes an inertia dampening assembly 50 that dampens the movement of car seat 10 from the position shown in FIG. 1A to the position shown in FIG. 1B. Dampening assembly 50 includes a pair of collars 51 coupled to opposite legs 26 of U-shaped tubular car base member 24, a pair of coil springs 52 positioned around legs 26, a pair of compliant tubular members 54 positioned around legs 26 inside of coil springs 52, and a pair of expansion members 56 positioned around legs 26 inside of coil springs 52 as shown in FIG. 3. Expansion members 56 are positioned between slidable brackets 40 and compliant tubular members 54.

As discussed above, slidable brackets 40 move to the right during a collision as shown in FIG. 1B. During this movement, slidable brackets 40 compress coil springs 52 to absorb a portion of the momentum of car seat 10 and the occupant. If the impact is significant enough, slidable brackets 40 will move expansion members 56 into contact with compliant tubular members 54 as compliant tubular members 54 abut collars 51. As shown in FIG. 3, expansion members 56 have a tapered end 58 that has an outside diameter that is smaller than the inside diameter of compliant tubular members 54 so that a portion of each expansion member 56 fits in each compliant tubular member 54. As slidable brackets 40 move expansion members 56 further into contact with compliant tubular members 54, expansion members 56 expand compliant tubular members 54 outward to absorb even more of the momentum.

After the forward movement of car seat 10 relative to base 12 is complete, coil springs 52 push slidable brackets 40 backward causing car seat 10 to move in a clockwise direction relative to base 12 as vehicle cushion 34 moves base 12 in the counterclockwise direction. Thus, a portion of the impact energy absorbed by dampening assembly 50 is used to return car seat 10 to the position shown in FIG. 1A. The energy absorbed by tubular members 54 as they were expanded by expansion members 56 is not returned. Thus, the amount of energy absorbed by dampening assembly 50 is greater than the amount of energy returned. Inherently, frictional loses will also impact the amount of energy that is returned compared to amount of energy absorbed. However, the amount of energy returned will be less than the amount of energy absorbed even when these frictional losses are factored out. By limited the amount of energy returned, the energy and speed of returning car seat 10 to its original position is decreased. Furthermore, if the collision (or sudden stopping without a collision) is less severe, expansion member will not have expanded compliant tubular members 54 and compliant tubular members 54 will remain available to absorb energy in any potential future, more severe collision. In other words, coil springs 52 may be sufficient to absorb the momentum alone.

Figure 7:
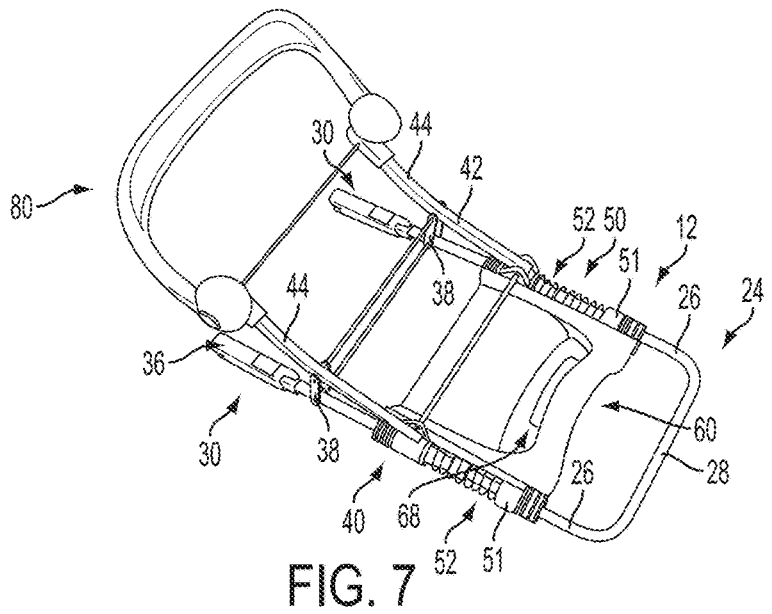
FIG. 7 is an enlarged view similar to FIG. 6 showing the shells removed and portions of an adjustment mechanism.
Figure 8:
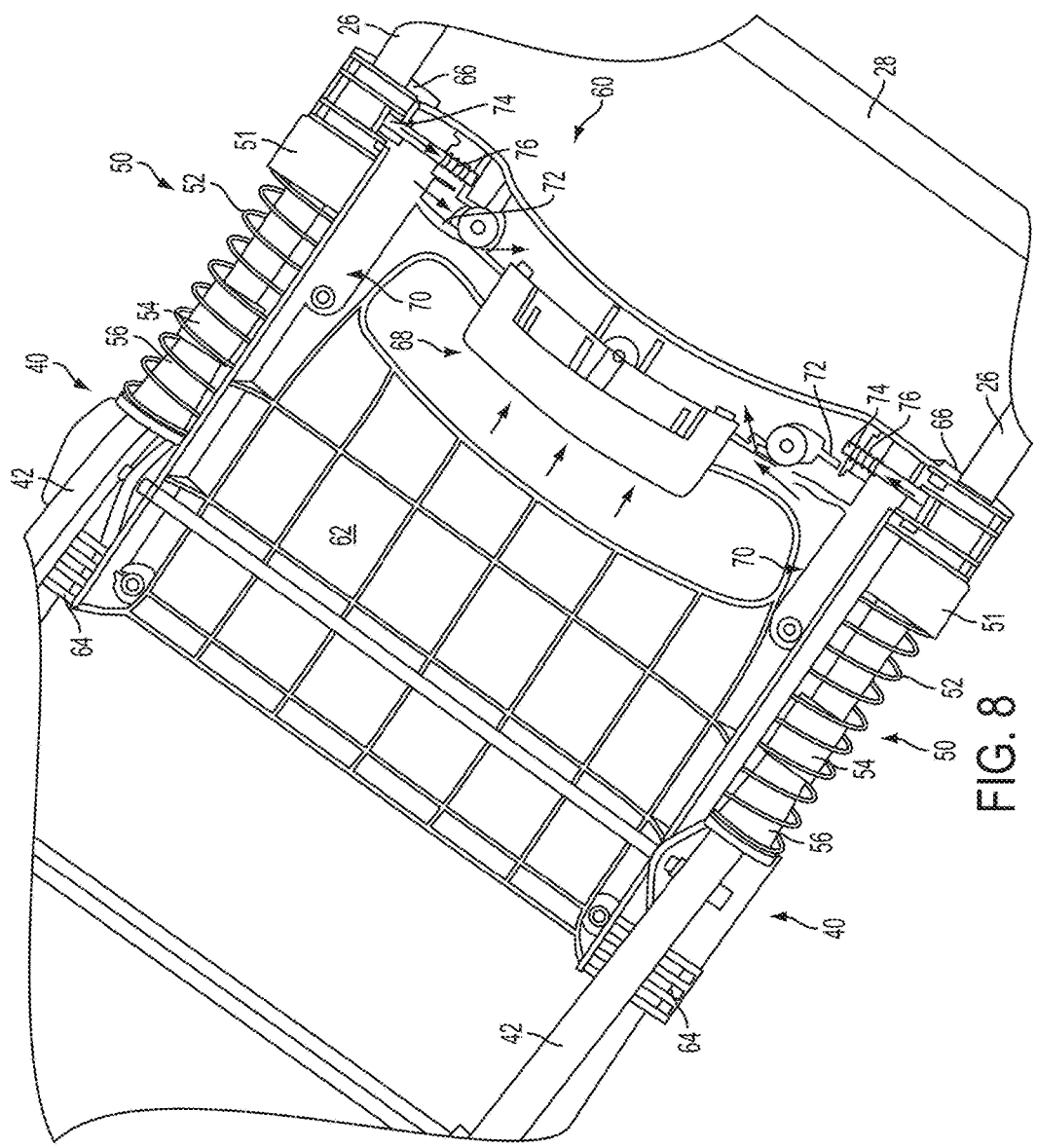
FIG. 8 is a perspective view of the base of FIG. 7 showing additional portions of the adjustment mechanism.

The initial angle of inclination of car seat 10 relative to base 12 can be adjusted. As shown in FIGS. 7 and 8, base 12 includes an adjustment assembly 60 having a base 62 including collars 64, 66 that slide over legs 26 of U-shaped tubular car base member 24, a button 68 slidable on base 62, a pair of levers 70, a pair of straps 72 extending between button 68 and levers 70, a pair of pins 74, and a pair of return springs 76. Collars 64 are positioned behind sliding brackets 40 and control the initial position of sliding brackets 40 and thus, the initial angular position of car seat 10 relative to base 12. Pins 74 are partially received within collars 66 and extend into respective pairs of apertures 78 in legs 26 of U-shaped tubular members 24. When pins 74 are positioned in a respective pair of apertures 78, the relative position of base 62 of adjustment assembly 60 is fixed, also fixing the initial position of sliding brackets 40. When pins 74 are removed from apertures 78, base 62 can slide along legs 26. As base 62 slides, sliding brackets 40 also slide, changing the initial angle of inclination of car seat 10 relative to base 12. For example, as base 62 slides forward, the angle of initial inclination decreases. As base 62 slides backward, the angle of initial inclination increase.

As base 62 slides forward, coil springs 52 compress. As base 62 slides backward, coil springs 52 decompress. Thus, the amount of initial compression of coil springs 52 can also be adjusted.

To remove pins 74 from apertures 78, a user pushes on button 68 by gripping a forward portion of base 62 and button 68. As button 68 is depressed, straps 72 pull levers 70 inward, which pull pins 74 inward out of apertures 78. When button is released, springs 76 push levers 60 outward, which push pins 76 outward and into respective apertures 78 that are aligned with pins 76.

As shown in FIGS. 1A, 1B, 2, and 4-7, base 12 further includes an extension 80 coupled to car seat base member 42. As shown in FIGS. 4-7, extension is U-shaped having a pair of legs 82 and a bend 84. As shown in FIG. 1A, legs 82 are curved having a profile that substantial corresponds to the contour of back cushion 86 of the vehicle seat. In the normal use position, legs 82 are positioned above lumbar portion 88 of cushion 86. During a collision, legs 82 slide along lumber portion 88. Furthermore, during return of car seat 10 to its initial position after a collision, legs 82 contact cushion 86 and block car seat 10 from rotating counter-clockwise much past the initial position as legs 82 compress cushion 86. To the extent car seat 10 rotates counterclockwise past the initial position, cushion 86 will decompress to return car seat 10 to the initial position. Thus, extension 80 restricts the ability of car seat 10 to overshoot the initial position after a collision. According to one embodiment, extension 80 is rotatably coupled to car seat base member 42. During installation of car seat 10 and base 12, the position of extension 80 can be adjusted by rotating it relative to car seat base member 42. This position can then be fixed.

An alternative embodiment car seat base 112 is shown in FIGS. 9-14 that is similar to car seat base 12 (similar or the same numbering is provided on components that are similar or the same for the two car seat bases, 12, 112). The features of each car seat base 12, 112 may be provided on the other car seat base 112, 12.

In car seat base 112, a car seat base member 142 incorporates the car seat attachment so that car seat 10 connects directly to car seat base member 142. In this embodiment, car seat base member 142 is made of three molded plastic components 115, 117, 119 that are connected with fasteners 121, such as screws or rivets. Metal rods, not shown, extend transversely across plastic components 115, 117, 119 to provide additional rigidity and strength.

Figure 9:
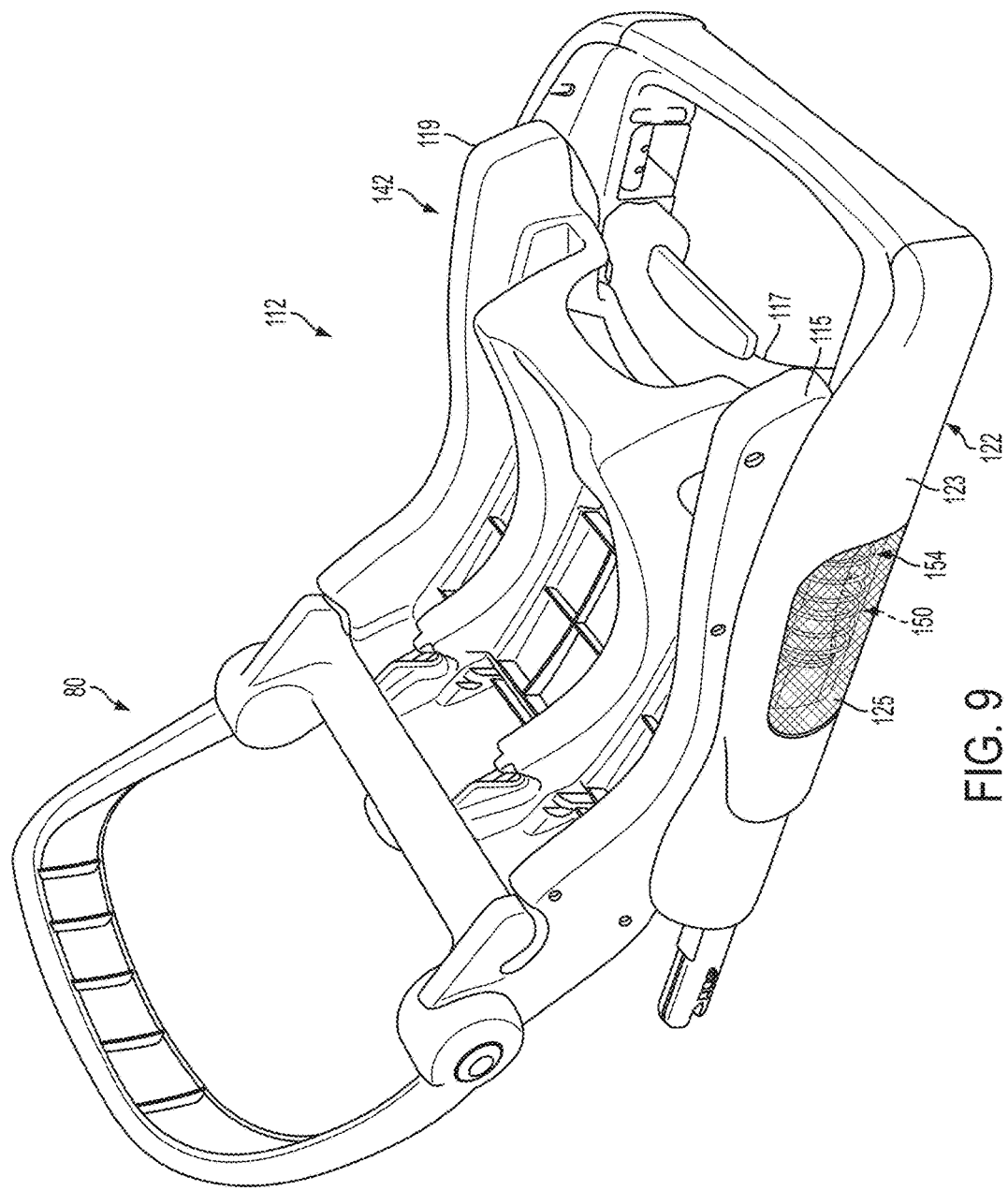
FIG. 9 is a perspective view of an alternative embodiment child car seat base.
Figure 10:
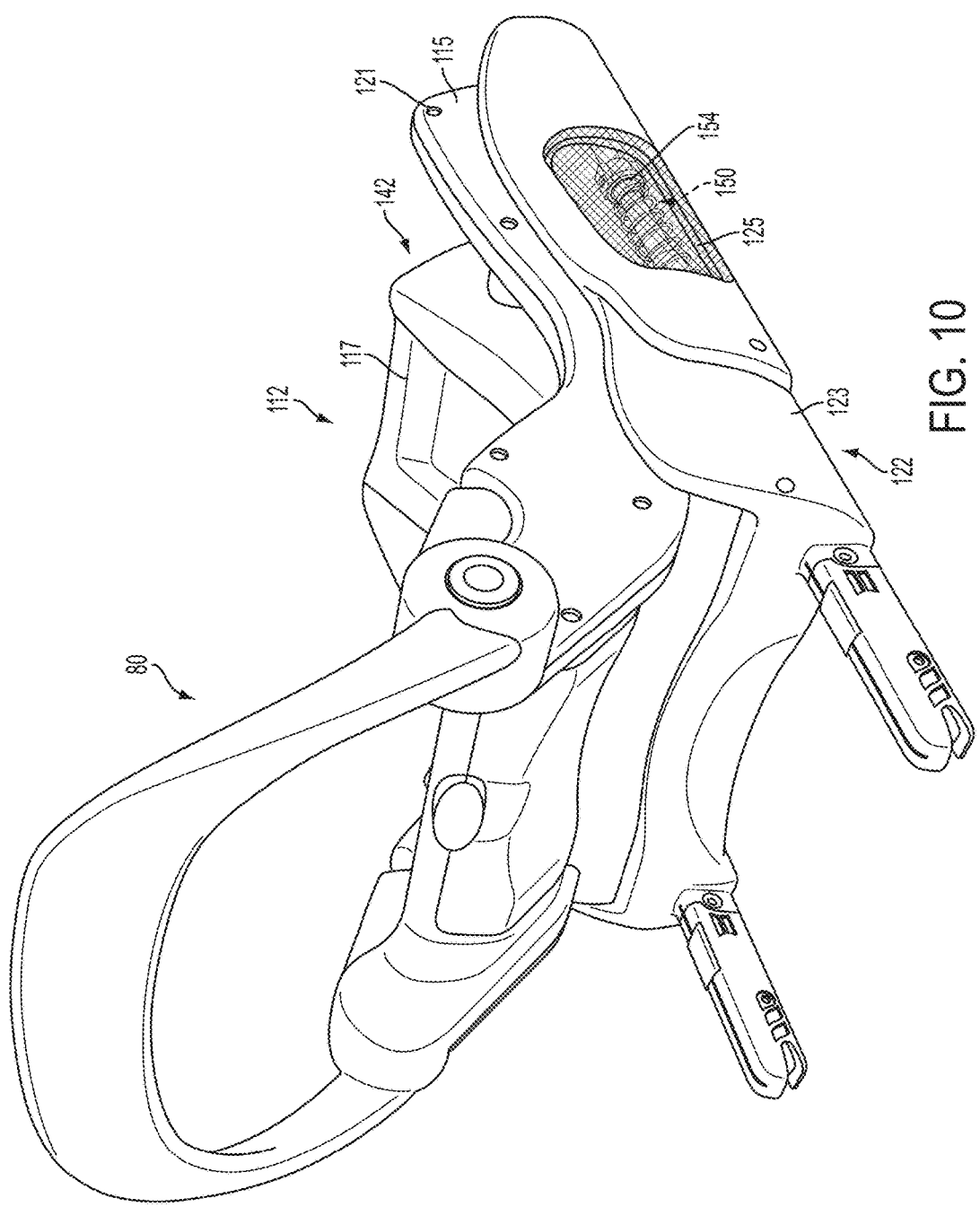
FIG. 10 is another perspective view of the child car seat base of FIG. 9.

As shown in FIGS. 9 and 10, cover 122 of car seat base 112 includes a main portion 123 and a window portion 125. Main portion 123 is preferably made of opaque or translucent plastic material that is difficult to see through. Window portion 125 is made of a transparent plastic material that can be seen through. As shown in FIGS. 9 and 10, window portion 125 allows a user to view inertia dampening assembly 150. As such, a user can view the operation of inertia dampening system 150 and also determine if tubular compliant members 154 were expanded.

Figure 11:
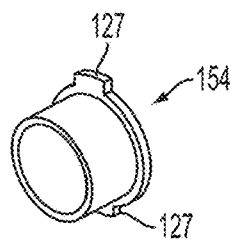
FIG. 11 is a perspective view of an alternative embodiment compliant tubular members of the car seat base of FIG. 9.
Figure 12:
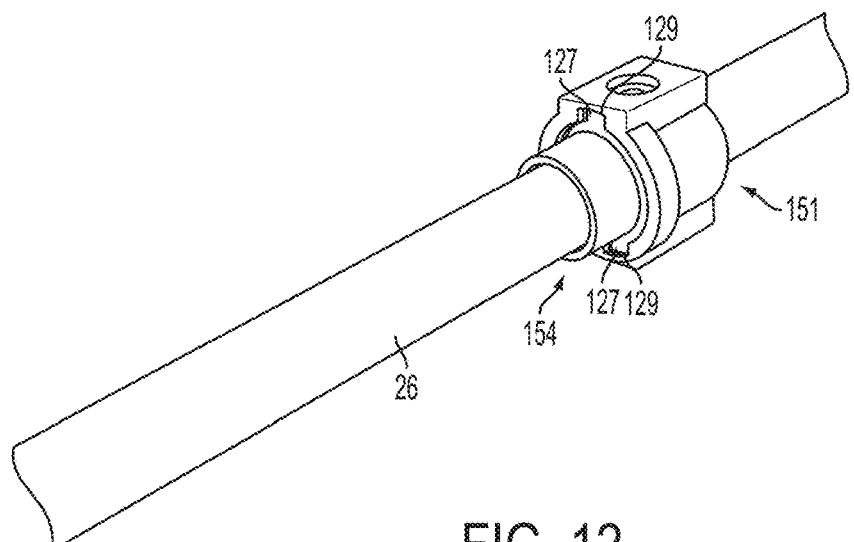
FIG. 12 is a perspective view of the compliant tubular member of FIG. 11 positioned within a collar positioned over a tubular member.
Figure 13:
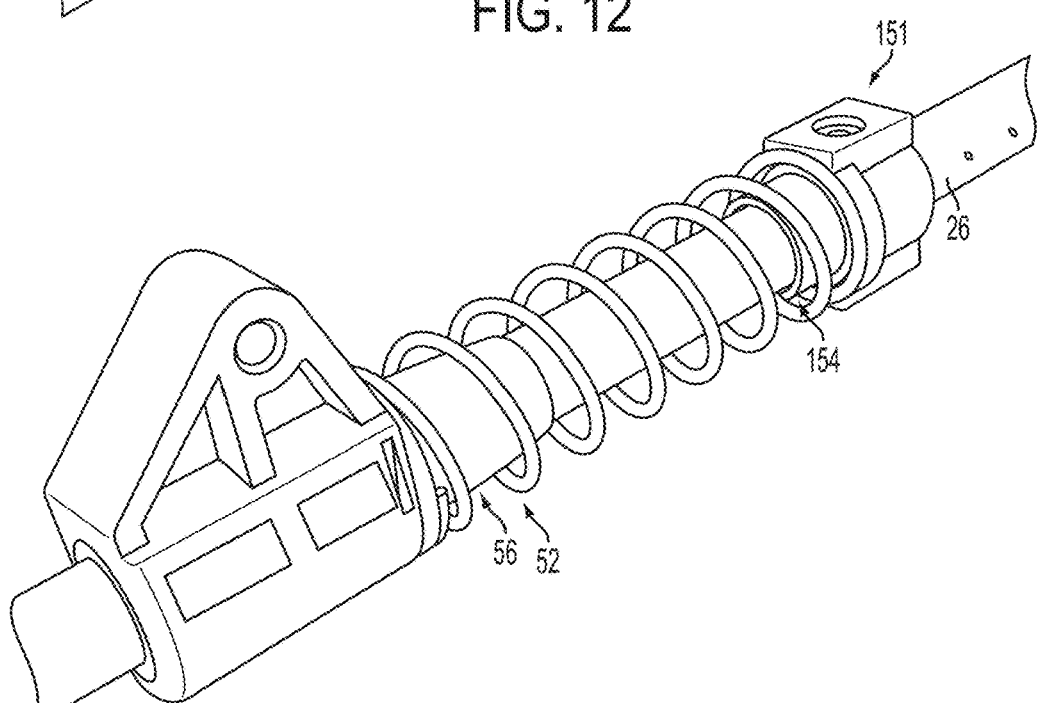
FIG. 13 is a perspective view of the compliant tubular member and collar of FIG. 12 along with a spring, expansion member, and slidable bracket positioned over the tubular member.

Tubular compliant member 154 of car seat base 112 is shown in detail in FIGS. 11-13. As shown in FIG. 11, compliant member 154 includes a pair of ears or tabs 127 that are received in tab-receiving recesses 129 in collars 151 of inertia dampening assembly 150. Springs 52 retain tabs 127 in tab-receiving recesses 129 to maintain the alignment compliant members 154 on legs 26 so that expansion members 56 are also aligned with compliant members 154 during activation of inertia dampening assembly 150.

Figure 14:
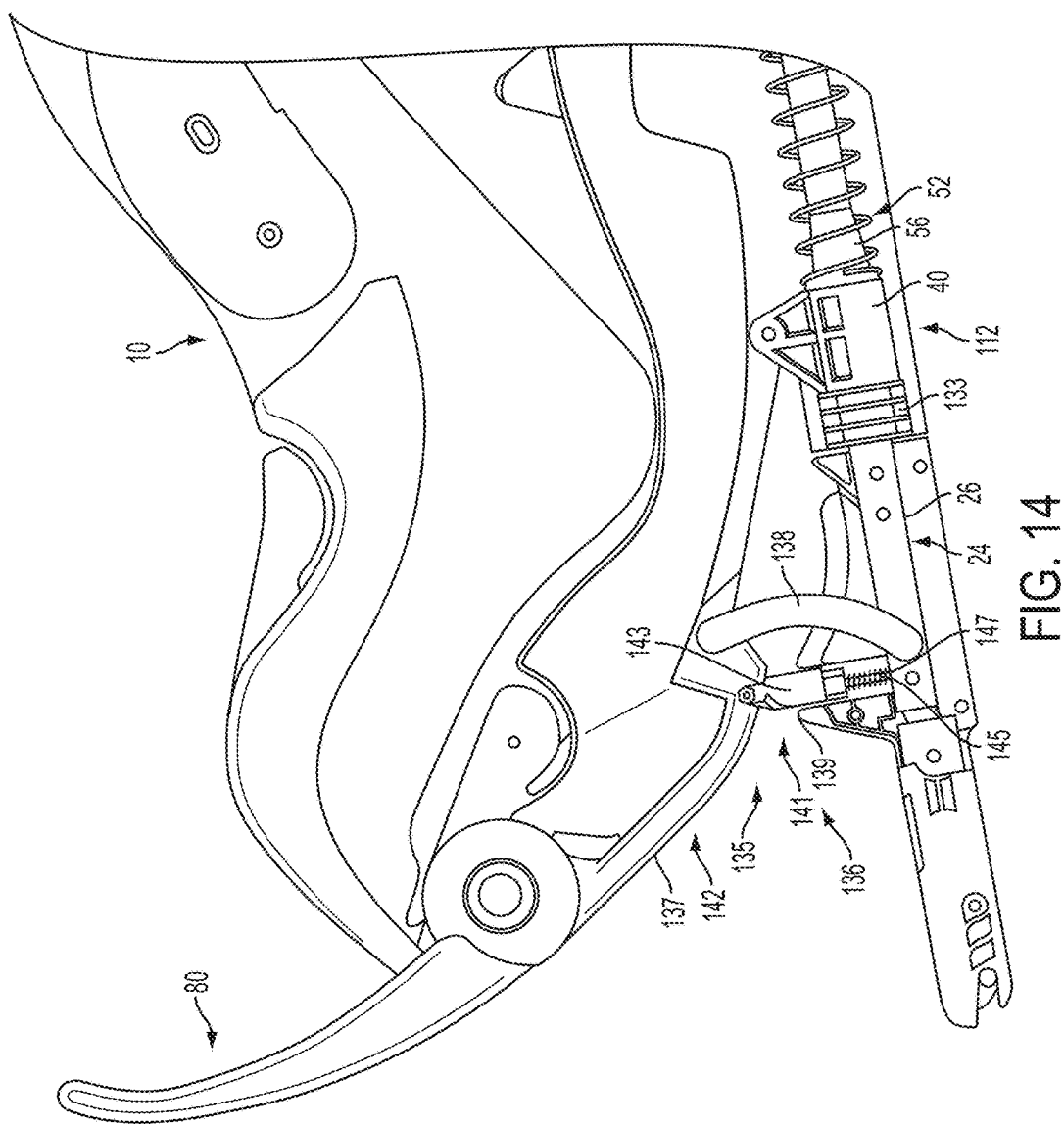
FIG. 14 is a partial cross-sectional view of the child car seat base of FIG. 9 and a car seat positioned on the car seat base.
Figure 15:
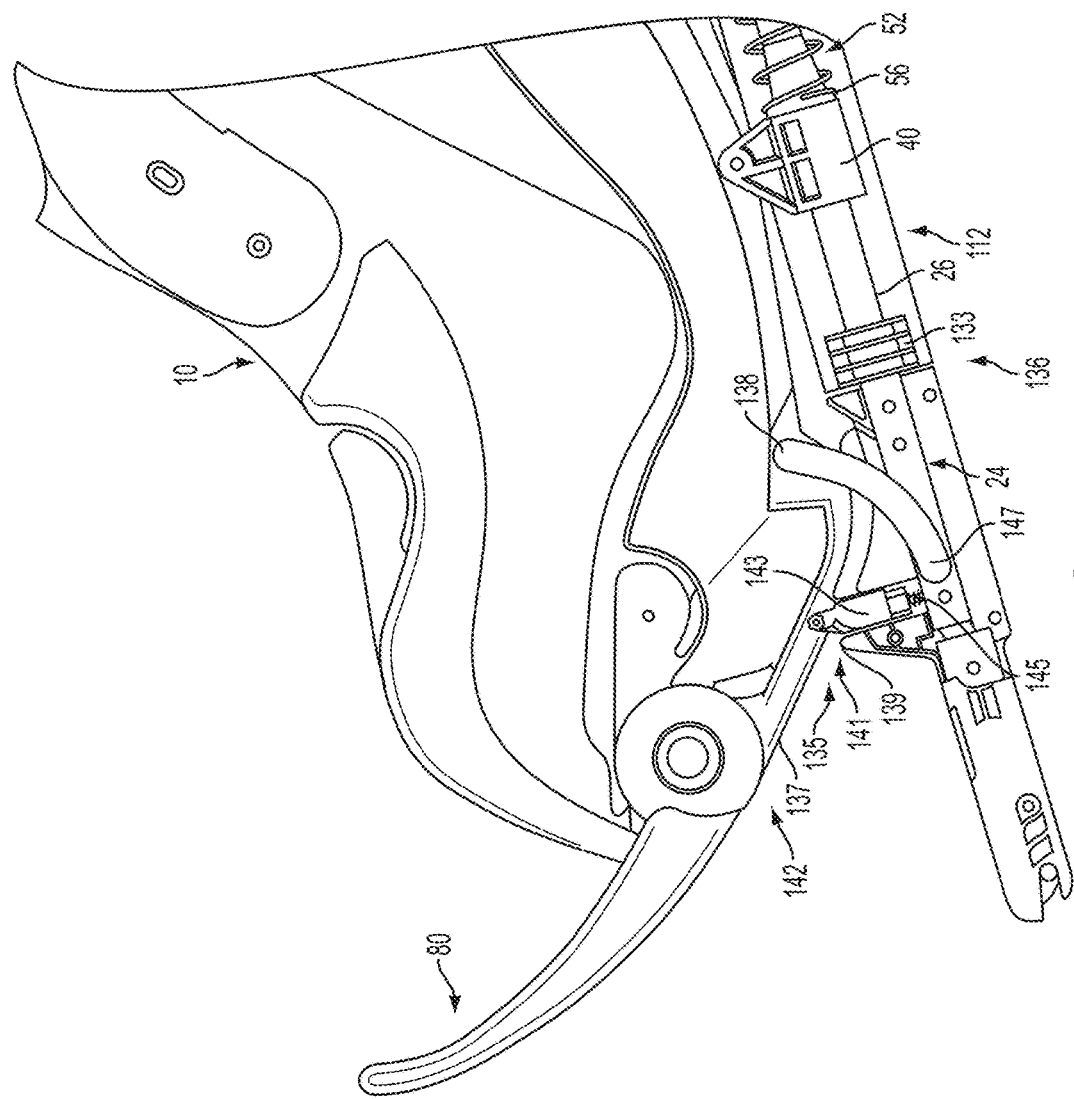
FIG. 15 is a view similar to FIG. 14 showing the car seat rotated in a counter-clockwise direction to compress a guard provided between components of the car seat base.

As shown in FIGS. 14 and 15, car seat base member 142 includes a pair of curved slots 131 to receive lap car seat belts (not shown). If anchors 32 are not provided on a car in which car seat base 112 is used, a user may extend a car seat belt through curved slots 131 and latch and tighten the seat belt to pivotably couple or secure car seat base 112 to the car.

As shown in FIGS. 14 and 15, first members 138 of attachment assembly 136 are curved. Stop members 133 are provided on legs 26 of U-shaped tubular car base member 24 to control the rearward movement of slidable brackets 40.

As shown in FIGS. 14, and 15, a gap 135 exists between a portion 137 of car seat base member 142 and a portion 139 of cover 122. According to the present disclosure, a compliant member 141 is provided that extends between portion 137 of car seat base member 142 and portion 139 of cover 122 to substantially fill in or block gap 135. Complaint member 141 includes a hinged member 143 that is pivotably coupled to portion 137 of car seat base member 142, a spring posts 145 pivotably coupled to U-shaped tubular car base member 24, and a plurality of springs 147 positioned over spring posts 145 to urge hinged member 143 toward portion 137 of car seat base member 142. As shown in FIGS. 14 and 15, hinged member 143 compresses springs 147 during movement of car seat base member 142 relative to U-shaped tubular base member 24 as the distance between portion 137 of cover and portion cover 122 changes.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

What is claimed is:
1. A car seat base including:
   a body;
   at least one coupler attached to the body and positioned to selectively couple the car seat base to a vehicle;

a car seat attacher providing at least one surface for selective coupling and decoupling of a child car seat to and from the car seat base while the car seat base remains secured to the vehicle, the car seat attacher being slidably coupled to the body;

a pivot member pivotably coupled on one end to the body and on the other end to the car seat attacher to change the orientation of the car seat attacher relative to the body in response to an inertial event.

2. The car seat base of claim 1, wherein the coupler pivotably couples the car seat base to the vehicle.

3. The car seat base of claim 1, wherein the base includes two leg portions.

4. The car seat base of claim 3, wherein the car seat attacher is slidably coupled to each of the leg portions separately.

5. The car seat base of claim 3, wherein the pivot member includes two pivot members, with one pivot member being pivotably coupled to each leg portion.

6. The car seat base of claim 3, wherein the leg portions are fixed relative to each other.

7. The car seat base of claim 1, wherein the at least one coupler is sized and shaped to attach to a universal LATCH system for vehicle car seats.

8. The car seat base of claim 1, further including a biaser that biases the car seat attacher towards a first position where the pivot member provides a maximum height differential between points at which the pivot member couples to the body and the car seat attacher.

9. The car seat base of claim 8, wherein sliding movement of the attacher along the base during an inertial event causes relative movement between the car seat attacher and the body in a direction opposite of biasing provided by the biaser.

10. The car seat base of claim 1, wherein the at least one coupler is positioned to be at a rear end of the body when coupled to a vehicle seat, the body further including a front end and a rear end relative to the vehicle when secured to the vehicle, an inertial event experienced by the car seat attacher causes a front end of the car seat attacher to rise relative to a rear end of the car seat attacher.

11. The car seat base of claim 1, wherein the pivot member is coupled to the car seat attacher and extends downward from the car seat attacher to couple to the body.

12. The car seat base of claim 1, wherein the car seat base includes a rear end and a forward end relative to the vehicle when secured to the vehicle, the pivot member is pivotably coupled to the seat attacher at a pivot location, and the pivot location moves toward the forward end of the car seat base as the attacher slides toward the forward end of the car seat base.

13. The car seat base of claim 1, further comprising a compliant member, wherein inertial energy of a car seat is absorbed by the compliant member during movement of the car seat in a forward direction relative to the car when secured to a car and a majority of the inertial energy is not returned to the car seat.

* * * * *